73323    CORN SHELLER    PATENTED
JAN 14 1868
J. R. Hamilton.
Fig. 1.
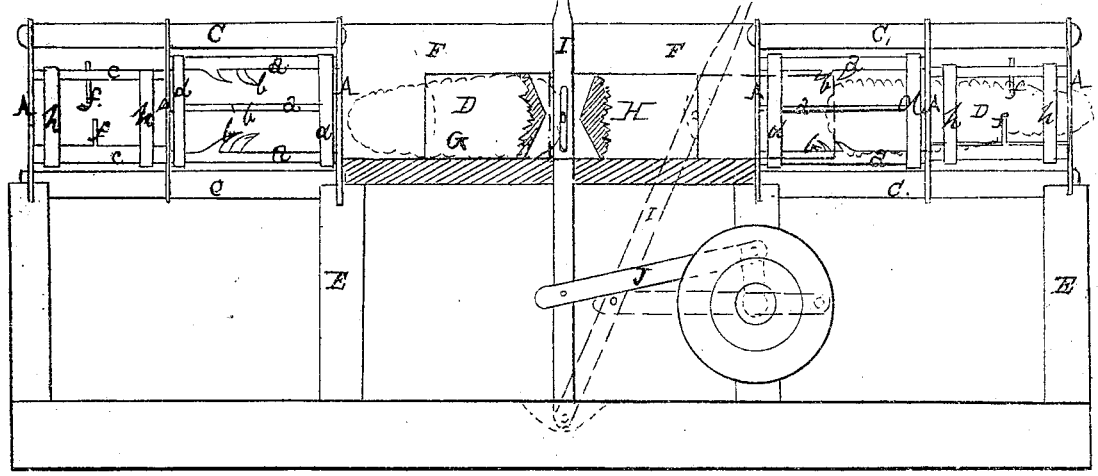
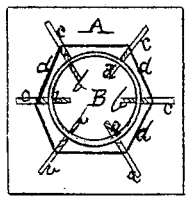
Fig. 3.
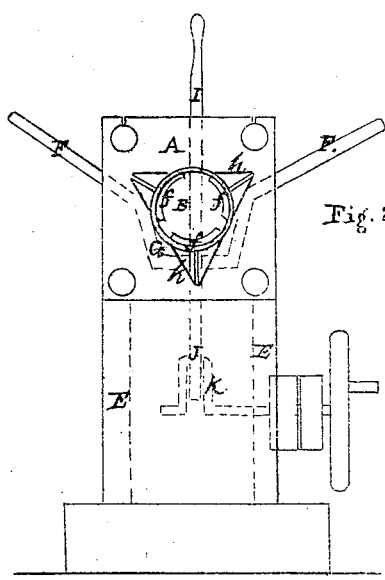
Fig. 2.
Witnesses: J. B. Woodruff, C. G. Greenleaf
J. R. Hamilton M.D.
Inventor

United States Patent Office

JONATHAN R. HAMILTON, OF PORTLAND, OREGON.

Letters Patent No. 73,323, dated January 14, 1868.

IMPROVEMENT IN CORN-SHELLERS.

The Schedule referred to in these Letters Patent and making part of the same.

TO ALL WHOM IT MAY CONCERN:

Be it known that I, JONATHAN R. HAMILTON, of Portland, in the county of Multnomah, in the State of Oregon, have invented certain new and useful Improvements in Corn-Shellers; and the following is a full, clear, and exact description of the same, reference being had to the accompanying drawings, making a part of this specification, in which—

Figure 1 represents a section through a side elevation, showing the machine double, working right and left.

Figure 2 is an end view of the same, showing the rear strippers for cleaning every kernel from the cob.

Figure 3 shows the front-end view of the shelling-mechanism.

The object of my invention is to produce the most simple, cheap, and practical corn-sheller, and it consists in the construction, arrangement, and combination of a series of yielding hook-strippers and scrapers placed in a frame in circular form, which the ears of corn are forced through by the action of a sliding plunger or piston working in a groove, into which the ears of corn place themselves from the hopper, the shelling-apparatus being made double, so that the plunger, being operated either by hand or mechanical power, it shells both ways in rapid and satisfactory manner.

To enable others to make and use my invention, I will describe it more fully, referring to the drawings, and to the letters marked thereon.

The shelling-apparatus, which consists of a frame having three plates, A A A, with circular openings, B B, through the centre, of sufficient size to admit the passage of any ordinary-size ears of corn, to be forced through endways, the plates A A being supported firmly, at suitable distances apart, by rods or bars C C. Between the plates A A is fitted a series of six, more or less, hooked bars, $a\ a\ a$, which have the rowers $b\ b$ pointing forward alternately, one forward of another, so as to run under the kernels in a line with the rows, the bars $a\ a$ being placed at their ends in the grooves or slits $c\ c\ c$ which converge towards the centre, and are made to yield to the taper and size of the ears of corn, by their being encircled by elastic India-rubber bands, $d\ d$, or any other equivalent springs. In the rear of the series of shelling-hooks $b\ b$, I place three or more bars, $e\ e\ e$, on which are secured circular scrapers $f\ f\ f$, which are also held, to act on the cob D as it is forced through, by rubber or other springs $h\ h$. The scrapers $f\ f$ will effectually remove every kernel of corn from the cob.

The shelling-apparatus, as above described, may be mounted on a frame, E, one or more of them, at each end of a hopper, F F, in which there is a groove or trough, G, sufficiently large to take in an ear of corn, D, one at a time, as the sliding plunger H is carried back and forth alternately by the action of the lever I, either by hand-power or by the pitman J and crank K, or any other mechanical arrangement to give the plunger H the necessary power and motion to force the ears of corn through the shelling-apparatus, as above described. The machine can be operated by power with great speed, and a large quantity of corn can be shelled with a single pair of the shelling-apparatus, as shown in fig. 1.

It will readily be seen that the shellers may be multiplied, and placed side by side, any number of them, at each end, with their corresponding grooves and plungers, so that any amount of corn may be shelled where a sufficient power can be applied for the purpose. The principle by which the kernels of corn are removed from the cobs is the most natural way, being that of the old hand-rower. The machine may be so arranged that the ears of corn may enter and be forced through vertically, or in any other desired position, without changing in any way my invention, the motion being equalized by a fly-wheel of any desired dimensions.

Having thus fully described my improved corn-sheller, what I claim as my invention, and desire to secure by Letters Patent, is—

1. The apparatus, as constructed, with a series of rowers, $a\ a\ a$, arranged in a circle, also the scrapers $f\ f\ f$ in the rear of the rowers, substantially as and for the purpose herein set forth.

2. I claim the rowers, as arranged alternately, the one forward of another, the same being pressed by springs towards the centre, so as to act as a wedge, parallel with, between, and under the rows of corn.

3. I claim the sliding plunger H, to push ears of corn between and through bars $a\ a\ a\ a$, with the rowers or points $b\ b$ attached either vertically or horizontally, as and for the purposes herein set forth.

J. R. HAMILTON.

Witnesses:
J. B. WOODRUFF,
Z. G. GREENLEAF.